United States Patent [19]
Douros, Jr. et al.

[11] 3,728,454
[45] Apr. 17, 1973

[54] ALLOXAN COMPOUNDS AS ANTIBACTERIAL AND ANTIFUNGAL AGENTS

[75] Inventors: John D. Douros, Jr.; Al Fred Kerst, both of Littleton, Colo.

[73] Assignee: The Gates Rubber Company, Denver, Colo.

[22] Filed: Aug. 14, 1970

[21] Appl. No.: 75,311

[52] U.S. Cl. ..........................424/251, 71/74, 71/92, 260/45.75
[51] Int. Cl. ............................A01n 9/00, A01n 9/22
[58] Field of Search......................................424/251

[56] References Cited

OTHER PUBLICATIONS

Bruckmann et al., J. Biol. Chem. 168, 241 (1947).

Jacobs, "Hypoglycemic Action of Alloxan", Proc. Soc. Exter. Cio. Med. 37; 407–409 (1937).

*Primary Examiner*—Albert T. Meyers
*Assistant Examiner*—Allen J. Robinson
*Attorney*—Raymond Fink, H. W. Oberg, Jr. and Curtis H. Castleman, Jr.

[57] ABSTRACT

Alloxan, alloxan monohydrate, and alloxan tetrahydrate can be used to inhibit and/or prevent the growth of undesirable herbs, bacteria, fungi, yeast, and other microorganisms. This invention is particularly concerned with the bacteriostatic and bactericidal properties of alloxan compounds against *Staphylococcus aureus* and *Escherichia coli*.

24 Claims, No Drawings

ALLOXAN COMPOUNDS AS ANTIBACTERIAL AND ANTIFUNGAL AGENTS

BACKGROUND OF THE INVENTION

The present invention relates to the use of alloxan compounds, i.e., compounds of the ureide of mesooxalic acid (alloxan) having the formula:

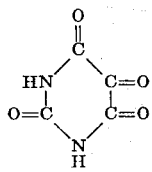

for killing or inhibiting the growth of such microorganisms as bacteria, yeast, and fungi. The chemical literature reveals few subjects, even within the rapidly expanding discipline of biochemistry, which have generated so many patent applications as the areas involving the biochemical uses of compounds which contain the barbituric acid nucleus,

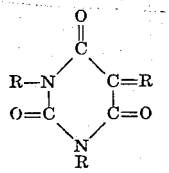

where R represents various substituents. Representative biochemical uses of such compounds are found in U.S. Pat. Nos. 2,561,688; 2,605,209; 2,725,380; 2,820,035; 2,887,487; and 3,102,072.

One reason for the tremendous range of application of barbituric compounds is that they have very often proved to be efficacious in killing or inhibiting the growth of a wide variety of microorganisms such as bacteria, yeast, and fungi. Therefore, the demonstrated biological activity of alloxan suggests that is may be used in various phases of agriculture. However, the chemical arts must also consider the general principles governing the formulation, method of application, metabolism, and potential toxic hazards of such microorganism inhibiting compounds along with their chemical structures and reactions. The alloxan, alloxan monohydrate, and alloxan tetrahydrate, of the present invention are no exception. References to some of the biological considerations associated with the use of alloxan compounds may be found in: Jacobs, H.R., *Hypoglycemic Action of Alloxan*, Proc. Soc. Exter. Cio. Med.,37: 407–409, (1937); Bailey, C.C. and Bailey, O.T., *Alloxan Diabetes with Diabetic Complications*,New Eng. J. Med., 230: 533–536,(1944).

In addition to these biological applications, the patent literature, U.S. Pat. No. 3,105,075, also reveals that substituted alloxan compounds have been used to treat cellulosic textiles in order to make them resistant to creasing and wrinkling.

SUMMARY OF THE INVENTION

According to the present invention, it has been found that the alloxan compounds:

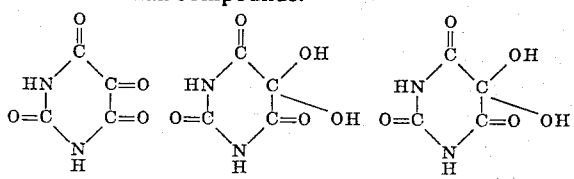

Alloxan, Alloxan Monohydrate, and Alloxan Tetrahydrate when present in effective quantities are very effective bactericidal, herbicidal, and fungicidal agents. References to various synthetic procedures for preparing alloxan are given by: Hartman, W. and Sheppard, O., Org. Syn. Coll. Vol. III, 37 (1955); Sperand, J. and Daboirch, T., Org. Syn. Coll. Vol. III, 39 (1955); and Holmgren, A. and Wenner, W., Org. Syn. Coll. Vol. IV, 23 (1963).

The alloxan compounds of the present invention were prepared in the following manner: A 5-liter, 3-neck flask was fitted with an overhead stirrer, thermometer, and powder additional funnel. The reaction vessel was immersed in a cold water vessel. To the reaction vessel was added 1.2 liters of water, 1.2 kilograms of concentrated HCL, and 600 grams of uric acid. The mixture was rapidly stirred while 150 grams of potassium chlorate were added over a 1-hour period at a rate which kept the reaction mixture between 33° and 35° C. After the potassium chlorate was added, the reaction mixture became homogeneous. This solution was transferred to a 4-liter beaker and diluted to 3.6 liters with acetic acid. Upon cooling to 5° C. for several hours, an alloxan compound which was predominantly alloxan monohydrate precipitated. The alloxan monohydrate was characterized by its decomposition point (240° to 250°C), infrared spectrum, and nitrogen analysis. The tetrahydrate was obtained by recrystallizing the monohydrate from water. The anhydrous alloxan was prepared by subliming the alloxan monohydrate.

The applicants have discovered that such alloxan compounds can be used to inhibit the growth of a wide variety of bacteria and fungi. For example, alloxan compounds may be employed:

AGAINST BACTERIA

| Bacteria | Disease Produced |
|---|---|
| *Pseudomonas aeruginosa* | Plant infections are caused by various pseudomonads. |
| *Erwinia carotovara* | Various species of Erwinia attack commercial crops of carrots, tobacco, potatoes, squash, et cetera. |
| *Xanthomonas phaseoli* | Various species of Xanthomonas cause a variety of diseases in plants such as sugar cane, rice, sugar beets, cotton, walnuts, wheat, rye, barley, beans, et cetera. |

AGAINST FUNGI

| Fungi | Crop Infection |
|---|---|
| Alternaria | Tomato spot, Cantalope rot, Carrot blight, Cotton leaf spot, Banana rot |
| Fusarium | Corn rot, Sweet potato rot, Tomato rot |
| Aspergillus | Apple rot, Corn seedling infection |
| Rhizopus | Sugar beet rot, Peanut disease |

The applicants have also found that when the alloxan compounds of this invention are applied to plant life during growth, harvest, and storage, microorganism growth is substantially arrested with very little damage to the general environment since alloxan compounds exhibit a high degree of biodegradability.

By plant life, it is meant those organisms including living plants, tubers, seeds, bushes, vegetables, and trees, and the like. Particularly prone to rot caused by fungi are various crops of great commercial importance such as tomatoes, melons, corn, peanuts, cucumbers, bananas and the like. Such losses occur both during growth and after harvest while these crops are in storage and transit. It should be noted that the applicants' alloxan compounds are particularly effective in reducing the loss to tomato crops caused by Bacterial Leaf Spot and Late Blight of Tomatoes. The effectiveness of these alloxan compounds against these particular diseases was established by the following test results:

| Compound: | Aqueous alloxan solution | Aqueous alloxan solution |
|---|---|---|
| Activity: | Foliar fungicide vs. Bacterial Leaf Spot of Tomato | vs. Late Blight of Tomatoes |
| % Inhibition at 500 ppm: | 69% | 48% |
| % Inhibition at 1000 ppm: | 100% | 98% |
| % Inhibition at 1500 ppm: | 100% | 100% |
| Control: | Maneb | Maneb |
| Control Concentration: | 100 ppm | 100 ppm |

NOTE: The alloxan compounds were sprayed on 25 tomato plants previously inoculated with Late Blight of Tomatoes (*Phytophthora infectans*) and 25 tomato plants previously inoculated with Bacterial Leaf Spot of Tomatoes (*Xanthomonas desicatoria*). Additional tomato plants growing in the same area and similarly infected with blight and leaf spot diseases were left untreated as controls. Subsequent examination of the treated plants and untreated control tomato plants revealed the above indicated degrees of control in the treated plants while most of the untreated control plants developed severe symptoms of Late Blight of Tomatoes and Bacterial Leaf Spot of Tomato.

The effectiveness of the alloxan compounds as a herbicide has also been established. Test results show:

| Compound | Activity | % Inhibition at 10 pounds/acre | % Inhibition at 5 pounds/acre |
|---|---|---|---|
| Aqueous alloxan solution | Herbicide vs. Mustard | 90% | 50% |
| Aqueous alloxan solution | vs. Crabgrass | 97% | 60% |
| Aqueous alloxan solution | vs. Buckwheat | 68% | 30% |
| Aqueous alloxan solution | Defoliant vs. cotton | 100% | 60% |

Those skilled in the art will recognize that the scope of the instant invention should not be limited by the above examples. For instance, it should be recognized that protectant, systemic, and eradicant procedures may provide detection of other fungicidal actions. Pathogens representative of *Phycomycetes, Ascomycetes, Basidiomycetes* and the *Fungi Imperfecti* may provide indices of other fungicidal activity. Furthermore, other appropriate host plants may establish other plant tolerance data. Additional pathogens and appropriate host plants may well afford additional opportunities to further define the degree and spectrum of the activity disclosed in this invention. Since no firm rules of procedure can be laid down for the sequence of such evaluations or for the choice of pathogens, each compound must be considered on the basis of its demonstrated performance in such primary evaluations and then progressively judged in subsequent studies. A wide range of pathogens, representative of economically important diseases, can be used to help define the spectra of activity and to assure high degrees of success under field conditions. The following disease organisms, crops, and reference standards may also be used in such evaluations:

| Disease | Disease Organism | Reference Compound |
|---|---|---|
| Powdery Mildew of Cucumbers | Erysiphe cichoracearum | Maneb, Karathane |
| Leaf Rust of Wheat | Puccinia rubigo-vera | Maneb, Karathane |
| Leaf Rust of Wheat | Puccinia rubigo-vera | Plantvax |
| Bacterial Leaf Spot of Tomatoes | Xanthomonas vesicatoria | Streptomycin |
| Rice Blast Disease | Piricularia oryzae | Blasticidin |
| Downy mildew of Sugar Beet | Peronospora schactii | Karathane |
| Downy mildew of Lima Bean | Phythphthora phaseoli | Karathane |
| Bean Rust | Uromyces phaseoli var. Typica | Karathane |
| Powdery mildew of Wheat | Erysiphe graminis | Karathane |
| Powdery mildew of Apple | Podosphaera leucotricha | Karathane |
| Powdery mildew of Roses | Sphaerotheca pannosa, var. rosae | Karathane |
| Powdery mildew of Cantalope | Erysiphe cichoracearum | Karathane |
| Leaf Spot of Wheat | Helminthosporium sativum | Maneb |
| Early Blight of Tomato | Alternaria solani | Maneb |
| Rice Foot Rot | Gibberella fugikuroi | Blasticidin |
| Cercospora Leaf Spot of Sugar Beets | Cercospora beticola | Maneb |
| Septoria Leaf Spot of Celery | Septoria apii-graveolentis | Maneb |
| Apple Scab | Venturia inaequalis | Cyprex |
| Common Bacterial Blight of Bean | Xanthomonas phaseoli | Streptomycin, Sulfate |

The applicants recommend the use of "in vivo" procedures whenever possible to test alloxan compositions of this invention to demonstrate their efficacy under more realistic conditions. However, not all pathogens lend themselves to such techniques. In order to provide additional spectrum definitions, the following fruit-rotting, storage decay, and bacterial pathogens may be tested by "in vitro" methods:

| | | |
|---|---|---|
| Brown rot of Stone Fruits | *Sclerotinia fructicola* | Captan |
| Grey mold of Fruit and Vegetables | *Botrytis cinerea* | Maneb |
| Rhizopus Fruit and Vegetable Rot | *Rhizopus nigricans* | Maneb |
| Citrus Blue Mold | *Penicillium italicum* | Karathane |
| Citrus Green Mold | *Penicillium digitatum* | Maneb |
| Blue Mold of Apple | *Penicillium Expansum* | Maneb |
| Bacterial Disease on many fruit crops | *Pseudomonas syringae* | Captan |
| Bacterial Soft Rot | *Erwinia caratovora* | Captan |

Another important advantage of alloxan fungicides, particularly in their agricultural applications, is that they can be made up in solid or liquid formulations. Examples of solid formulations are dust, wetable powders, granules, and pellets. As a dust, alloxan compounds may be dispersed in powdered solid carriers such as talc, soaps, soapstone, attapulgus clay, as well as other finely divided solids known to the dusting art. When formulated as wetable powders, the active component may be employed in conjunction with interfillers which may be of the clay type carrier or non-clay type, in conjunction with various combinations of wetting agents and emulsifiers which permit the adaptation of the concentration as a free flowing powder.

Each of these carriers may contain one or more of the specified alloxans or unresolved mixtures of the alloxan compounds of this invention with other carriers or extenders which are ordinarily non-reacting or inert substances such as sand, clays, talc, sawdust, alkaline earth carbonates, oxides, phosphates, and the like, as well as diatomacious earth, micas, or other suitable materials.

When liquid formulations are desirable, liquid extenders, dilutants or carriers of a non-reactive nature may be utilized. Examples of such materials are alcohol, ketones, glycols, aromatic hydrocarbons, petroleum fractions such as octane, and various other distillates.

Where it is desired to use the aforementioned wetable powders or liquid formulations, either emulsified, dispersed, or suspended in water or other fluids, one or more of the class of materials herein referred to as adjuvants can also be incorporated into the powder, dust, or liquid formulation. These adjuvants comprise surface active agents, detergents, wetable agents, stabilizers, dispersing agents, suspending agents, emulsifying agents, spreaders, stickers, and conditioning agents generally. To their modifying characteristics these adjuvants may facilitate handling and application and infrequently enhance or potentiate the alloxan compositions of this invention in their inhibitory activity by mechanisms which are frequently not well understood. A satisfactory but not exhaustive list of these adjuvants appears in "Soap Chemical Specialities," Volume 31 No. 7, Page 61; No. 8, Pages 48 – 61; No. 9, Pages 52 – 67; and No. 10, Pages 38 – 67 (1955). See also, Bulletin No. 607 of the Bureau of Entomology and Plant Quarantine of the United States Department of Agriculture.

An additional advantage of such alloxan compositions is their compatability with a variety of other biocidal and fungicidal materials. For example, it may be convenient to combine one or more alloxan compositions with one or more adjuvants and carriers with other pesticides, biocides, and fungicides of various structures. For example, the alloxan fungicidal inhibitors may be combined with insecticidal materials such as chlordane, benzene hexachlorides, dichlorodiphenyl trichloroethane (DDT), the insecticidal carbamates, polychlorinated terpenes, parathions, methoxychlor, insecticidal phosphates, phosphorothioates, phosphorodithioates and with fungicides such as sulphur, quinones, dodecylgaunidine, and metal dimethyldithiocarbamates.

There are, however, other considerations, such as compound concentrations and methods of application, which may make some methods of application more favored than others. These considerations may include the type of organisms on which the compound is to be administered, the degree of activity, the degree of inhibition toward the organism, and side effects. Also to be considered, is the cost of production and the characteristic solubility of the compounds into which the alloxan is to be introduced.

In their antibacterial aspects, the applicants have found the alloxan compounds of this invention, when present in effective quantities, act as bacteriocides at relatively low concentrations. For example, it has been discovered that alloxan compounds are especially efficacious against *Staphylococcus aureus* and *Escherichia coli*. The in vitro effectiveness of these alloxan compounds against these bacteria was established by the following test:

One loopful of each of the *Staphylococcus aureus* and *Escherichia coli* was transferred from agar slants to 10 ml. of trypticase soybroth and incubated at 37° for 18 hours. At the end of this time, the bacteria were seeded into the same medium (+2 percent agar) 19 which the original inoculum was prepared. The bacteria were seeded at 1 ml. of inoculum per 250 ml. of medium which were equivalent to at least $1 \times 10^6$ cells/ml. The resulting mixture was poured into a heat resistant petri dish at a temperature of 45° C. Analytical filter paper discs of ½ inch diameter were used for the agar diffusion technique. Each disc is saturated with 0.08 ml. of the solubilized test compounds at 100 mg./disc and placed on the surface of the hardened agar. The plates are incubated at 37° C. for 18 hours. The activity of the alloxan compounds was established by measuring the zone of inhibition in centimeters. The larger the zone of inhibition, the more potent the anti-bacterial activity of the alloxan compound. Untreated control plates were used as a basis for comparison and these exhibited a diffused, profuse growth of bacteria.

The test results using alloxan, alloxan monohydrate, and alloxan tetrahydrate against these bacteria and against other bacteria under similar experimental conditions produced the following results:

| Microorganism (GRAM positive and GRAM negative bacteria) | Zone of inhibition In Centimeters for Alloxan | Zone of inhibition In Centimeters for Alloxan Monohydrate | Zone of inhibition In Centimeters for Alloxan Tetrahydrate |
|---|---|---|---|
| *Staphylococcus aureus* ATCC No. 6538 | 1.8 | 1.6 | 1.3 |
| *Escherichia coli* ATCC No. 9637 | 1.6 | 1.4 | 1.2 |
| *Shigella dysenteriae* ATCC No. 9212 | 0.6 | 0.5 | 0.4 |
| *Shigella sonnei* ATCC No. 9290 | 0.6 | 0.5 | 0.4 |
| *Salmonella panama* ATCC No. 7378 | 1.0 | 0.9 | 0.7 |
| *Salmonella paratyphi* ATCC No. 9281 | 1.0 | 0.9 | 0.7 |
| *Salmonella enteritis* ATCC No. 13076 | 1.0 | 0.9 | 0.7 |
| *Salmonella pullorum* ATCC No. 10398 | 1.0 | 0.9 | 0.7 |
| *Salmonella derby* ATCC No. 6960 | 1.0 | 0.9 | 0.7 |
| *Salmonella gallinarium* ATCC No. 9184 | 1.0 | 0.9 | 0.7 |
| *Salmonella typhosa* ATCC No. 19430 | 1.0 | 0.9 | 0.7 |
| *Neisseria gonorrhoeae* ATCC No. 19424 | 3.3 | 3.0 | 2.5 |
| *Neisseria weichselbaumii* ATCC No. | 3.2 | 2.9 | 2.5 |
| *Neisseria meningitidis* | 3.2 | 2.9 | 2.4 |

| | | |
|---|---|---|
| ATCC No. 13077 | | |
| Listeria monocytogenes | 1.5  1.3 | 1.1 |
| ATCC No. 15313 | | |
| Vibrio fetus | 2.0  1.8 | 1.5 |
| ATCC No. 15296 | | |
| Vibrio cholerae | 2.0  1.8 | 1.5 |
| ATCC No. 14035 | | |
| Mycobacterium leprae | 1.0  0.9 | 0.7 |
| ATCC No. 4243 | | |
| Mycobacterium avium | 1.0  0.9 | 0.7 |
| ATCC No. 19421 | | |
| Mycobacterium bovis | 1.0  0.9 | 0.7 |
| ATCC No. 19274 | | |
| Mycobacterium phlei | 1.0  0.9 | 0.7 |
| ATCC No. 11782 | | |
| Micrococcus tetragena | 1.0  0.9 | 0.7 |
| ATCC No. 10875 | | |
| Micrococcus melitensis | 1.0  0.9 | 0.7 |
| ATCC No. 19396 | | |
| Micrococcus lysodeikticus | 1.0  0.9 | 0.7 |
| ATCC No. 4698 | | |
| Corynebacterium diphtheriae | 2.2  2.0 | 1.6 |
| ATCC No. 19409 | | |
| Corynebacterium haemolyticum | 2.2  2.0 | 1.6 |
| ATCC No. 9345 | | |
| Diplococcus intracellularis | 2.2  2.0 | 1.6 |
| ATCC No. | | |
| Diplococcus pneumoniae | 2.2  2.0 | 1.6 |
| ATCC No. 6303 | | |
| Haemophilus haemolyticus | 2.2  2.0 | 1.6 |
| ATCC No. 10014 | | |
| Haemophilus influenzae | 2.2  2.0 | 1.6 |
| ATCC No. 19418 | | |
| Haemophilus parainfluenzae | 2.1  1.9 | 1.5 |
| ATCC No. 7901 | | |
| Haemophilus suis | 2.1  1.9 | 1.5 |
| ATCC No. 19417 | | |
| Haemophilus vaginalis | 2.2  2.0 | 1.6 |
| ATCC No. 14018 | | |
| Bacteroides nigrescens | 0.9  0.8 | 0.6 |
| ATCC No. | | |
| Bacteriodes pneumosintes | 1.0  0.9 | 0.7 |
| ATCC No. | | |
| Bacteroides serpens | 1.0  0.9 | 0.7 |
| ATCC No. | | |
| Brucella abortus | 1.0  0.9 | 0.7 |
| ATCC No. 4315 | | |
| Brucella melitensis | 1.0  0.9 | 0.7 |
| ATCC No. 19396 | | |
| Brucella suis | 1.0  0.9 | 0.7 |
| ATCC No. 4312 | | |

Although the precise mode of action whereby alloxan compounds inhibit the growth of such bacteria is not completely understood, it is believed that the alloxan compounds of this invention may serve as chemical antagonists; that is, as chemicals which compete with enzymes essential to the development of such bacteria. Since enzymes perform their catalytic function by virtue of their affinity for their natural substrate; any compound resembling a substrate in its chemically critical aspect may also have an affinity for the enzymes. If this affinity is great enough, the analog will displace the normal substrate from the enzyme and will prevent the growth reaction from taking place. It is believed that alloxan has a chemical affinity for an essential site on one enzyme necessary for bacterial growth and life.

To further illustrate the workings of anti-bacterial and anti-fungal aspects of this invention, the following other examples are submitted:

EXAMPLE I - Determining Anti-Fungal Activity of Alloxan Compounds Against Test Organisms.

Experimental

The following viable test fungi are treated as described below:

*Fusarium oxysporum*

*Fusarium roseum*

*Rhizopus nigricans*

*Rhizopus stolonifer*

*Aspergillus niger*

*Alternaria solani*

One loopful of each of the above viable fungi cultures, spores, and mycelia is tranferred from an agar slant to an 80 ml. portion of the nutrient broth composed of oatmeal agar, Czapeks, Sabouraud, and Deionized water to volume.

The 80 ml. portion of the fungi and broth is placed in a sterile shake flask (300 ml.) and the flask is placed on a rotary shaker for 96 to 120 hours at room temperature. At the end of this incubation time period, 10 ml. of the liquid are homogenized and placed into another sterile shake flask (300 ml.) containing 80 ml. of the above nutrient broth and 60 p.p.m. of the inhibitor being evaluated. The flasks are placed on a rotary shaker operating at 240 r.p.m. at room temperature for 3 to 9 days. After this second incubation time, the flasks are taken off and examined for visible fungal growth and mycelial weights are determined. Untreated controls are used as the basis of comparison.

RESULTS

The alloxan compounds of this invention imparted a substantial degree of inhibition of fungal growth at 60 p.p.m.

EXAMPLE II - Formulation of a Paint Having

Anti-Mildew Properties.

The following ingredients are blended and ground together in the indicated proportions in a ball mill.

| Ingredient | Pounds per 1000 gallons |
|---|---|
| Gum rosin, Grade W.W. | 380 |
| Blown fish oil | 238 |
| Zinc stearate | 20 |
| Alloxan | 20 |
| Zinc oxide | 160 |
| Magnesium silicate | 60 |
| Solvent naphtha | 222* |
| Lamp Black | 2 |

*Volume adjusted to 1000 gallons by the addition of naphtha.

EXAMPLE III - Anti-Mildew Paint Formulation.

The following ingredients are blended together in the indicated proportions in a ball mill.

| Ingredient | Pounds per 1000 Gallons |
|---|---|
| Rosin | 300 |
| Coal tar | 100 |
| Talc | 100 |
| Pine oil | 50 |
| Alloxan | 50 |
| High flash naphtha and mineral spirits | 200* |

*Volume adjusted to 1000 gallons by the addition of high flash naphtha and mineral spirits.

EXAMPLE IV - Preparation of a Vinyl Coating Resistant to Mildew Deterioration.

A vinyl coating is prepared using a commercially available preparation without a fungal growth inhibitor.

An identical vinyl coating is prepared except that 2 percent by weight of alloxan monohydrate is incorporated into the coating formulation.

Two sets of components such as asbestos tubing, silk-wrapped transformers and rayon-wrapped solenoids are obtained. One set is sprayed with the vinyl coating containing inhibitor, the other with the identical coating without inhibitor.

EXAMPLE V - Preparation of Plasticizers Resistant to Mildew.

A commercial thermoplastic monomer is divided into four portions which are treated as follows:

Portion 1: To this first portion is added 2 percent by weight of alloxan monohydrate and 10 percent by weight of dimethylnaphthalate as plasticizer. The monomer is polymerized and and molded as above.

Portion 2: To this portion is added 2 percent by weight of alloxan monohydrate and 10 percent by weight of butyl isodecylphthalate as plasticizer. The monomer is polymerized and molded as above.

Portion 3: This portion is the untreated control of Portion 1 containing no fungal inhibitor but 10 percent by weight of dimethylphthalate as plasticizer. Again, the polymerization and molding are identical.

Portion 4: This portion is the untreated control of Portion 2 containing no fungal inhibitor but 10 percent by weight of butyl isodecylphthalate as plasticizer. The polymerization and molding are as described above.

The two plasticizers are chosen on the basis of their known susceptibility to *Fusarium* attack under high humidity and temperature conditions.

EXAMPLE VI - Evaluation of the Paint Formulations, Vinyl Coatings, and Plasticizers for Mildew and Fungal Resistance.

A. The paint formulations from Examples II and III are painted on steel test panels which are allowed to dry and then placed in an air-tight high temperature and high humidity chamber maintained at 80° F. and 95 percent humidity to stimulate tropical temperature and humidity conditions. At the same time, steel test panels painted with the untreated control formulations are placed in the same chamber.

B. The vinyl coated articles of Example IV are placed in an identical heat and humidity chamber with control articles.

C. The four discs of Example V made as previously described are placed in a third high temperature and humidity chamber similar to the two described above.

RESULTS

A. After a one-month test period, the control paint panels are found to be coated with various fungi including *Fusarium*, *Penicillium*, and *Aspergillus* species and are discolored. The treated painted panels are unaffected.

B. After a month's exposure the vinyl coated articles treated with inhibitor are only slightly attacked by rot while the articles coated with vinyl without inhibitor are rotted through.

C. After a month of testing, the two untreated control discs are examined and are found to be blackened and rotted. Isolates of *Aspergillus* and *Fusarium* of unknown species are prepared from the deteriorated discs. The two discs containing fungal inhibitors are not adversely affected.

EXAMPLE VII - Evaluation of Alloxan Compositions as Mildew Retardant in Cotton.

Tests similar to those described in detail in Method 5762, "Mildew Resistance of Cloth; Soil Burial Method," of Federal Specification CCC-T-191, "Textile Test Methods" are used; that is, standard "blue-line" cotton duck fabric (3" × 3") is impregnated with 2 percent solutions of alloxan composition calculated on the dry weight of the fabric. The fabric is cut in three 1" × 3" strips which are raveled and buried vertically. At the same time, an identical piece of 3" × 3" cotton duck fabric untreated for control purposes is buried using the same techniques and location. At the end of 5 days' burial, the two groups of buried cotton are removed and tested for loss of breaking strength as compared to unburied controls. Cloth treated with alloxan compounds requires substantially more force to break than the untreated control cloth.

Having thus disclosed our invention, we claim:

1. A method of killing or inhibiting the growth of microorganisms selected from the group consisting of fungi, Gram positive bacteria, and Gram negative bacteria which comprises applying to said microorganisms an effective fungicidal, bactericidal or bacteriostatic amount of an alloxan compound wherein said alloxan compound is selected from the group consisting of alloxan, alloxan monohydrate, alloxan tetrahydrate and mixtures thereof.

2. The method of claim 1 wherein the fungicidal, bactericidal or bacteriostatic compound is alloxan.

3. The method of claim 1 wherein the fungicidal, bactericidal or bacteriostatic compound is alloxan monohydrate.

4. The method of claim 1 wherein the fungicidal, bactericidal or bacteriostatic compound is alloxan tetrahydrate.

5. The method according to claim 1 wherein the Gram positive bacteria are selected from the group consisting of *Staphylococci*, *Corynebacter*, *Listeria*, *Micrococci*, *Mycobacterium*, and *Diplococci*.

6. The method according to claim 5 wherein the *Staphylococci* is *Staphylococcus aureus*.

7. The method according to claim 5 wherein the *Corynebacter* are selected from the group consisting of *Corynebacterium diphtheriae* and *Corynebacterium haemolyticum*.

8. The method according to claim 5 wherein the *Listeria* is *Listeria monocytogenes*.

9. The method according to claim 5 wherein the *Micrococci* are selected from the group consisting of *Micrococcus tetragena*, *Micrococcus melitensis*, and *Micrococcus lysodeikticus*.

10. The method according to claim 5 wherein the *Mycobacterium* are selected from the group consisting of *Mycobacterium avium, Mycobacterium bovis, Mycobacterium phlei,* and *Mycobacterium leprae.*

11. The method according to claim 5 wherein the *Diplococci* are selected from the group consisting of *Diplococcus intracellularis* and *Diplococcus pneumoniae.*

12. The method according to claim 1 wherein the gram negative bacteria are selected from the group consisting of *Escherichia, Shigella, Salmonella, Vibrio, Neisseria, Haemophilus, Bacteroides,* and *Brucella.*

13. The method according to claim 12 wherein the *Escherichia* is *Escherichia coli.*

14. The method according to claim 12 wherein the *Shigella* are selected from the group consisting of *Shigella dysenteriae,* and *Shigella sonnei.*

15. The method according to claim 12 wherein the *Salmonella* are selected from the group consisting of *Salmonella derby, Salmonella enteritis, Salmonella gallinarium, Salmonella panama, Salmonella paratyphi, Salmonella pullorum,* and *Salmonella typhosa.*

16. The method according to claim 12 wherein the *Vibrio* are selected from the group consisting of *Vibrio cholerae* and *Vibrio fetus.*

17. The method according to claim 12 wherein the *Neisseria* are selected from the group consisting of *Neisseria gonorrhoeae, Neisseria weichselbaumii,* and *Neisseria meningitides.*

18. The method according to claim 12 wherein the *Haemophilus* are selected from the group consisting of *Haemophilus haemolyticus, Haemophilus influenzae, Haemophilus parainfluenzae, Haemophilus suis,* and *Haemophilus vaginalis.*

19. The method according to claim 12 wherein the *Bacteroides* are selected from the group consisting of *Bacteroides nigrescens, Bacteroides pneumosintes,* and *Bacteroides serpens.*

20. The method according to claim 12 wherein the *Brucella* are selected from the group consisting of *Brucella abortus, Brucella melitensis,* and *Brucella suis.*

21. The method of claim 1 wherein the fungi is selected from the group consisting of *Fusarium, Penicillium,* and *Aspergillus.*

22. The method according to claim 1 wherein the bacteria is *Xanthomonas desicatoria.*

23. The method according to claim 1 wherein the bacteria is *Phytophthora infectans.*

24. A method of killing or inhibiting the growth of microorganisms selected from the group consisting of fungi, Gram positive bacteria and Gram negative bacteria on plants which comprises applying to said plants an effective bactericidal, bacteriostatic or fungicidal amount of a compound selected from the group consisting of alloxan, alloxan monohydrate, alloxan tetrahydrate and mixtures thereof.

* * * * *